United States Patent [19]

Loos et al.

[11] Patent Number: 4,748,772

[45] Date of Patent: Jun. 7, 1988

[54] APPARATUS FOR THE PRECISION WORKING OF THE TOOTH SYSTEM OF BEVEL GEARS

[75] Inventors: Herbert Loos, Dorfen Stadt; Manfred Erhardt, Puchheim, both of Fed. Rep. of Germany

[73] Assignee: Carl Hurth Maschinen- und Zahradfabrik GmbH & Co., Munich, Fed. Rep. of Germany

[21] Appl. No.: 65,039

[22] Filed: Jun. 19, 1987

Related U.S. Application Data

[62] Division of Ser. No. 832,100, Feb. 21, 1986, Pat. No. 4,694,617.

[30] Foreign Application Priority Data

Feb. 23, 1985 [DE] Fed. Rep. of Germany ....... 3506499

[51] Int. Cl.⁴ ............................................. B24B 19/00
[52] U.S. Cl. ................................ 51/105 GG; 51/287; 409/12; 409/37
[58] Field of Search ............ 51/26, 105 HB, 105 GG, 51/287; 409/12, 37, 38, 39, 49

[56] References Cited

U.S. PATENT DOCUMENTS

| | | | |
|---|---|---|---|
| 1,884,292 | 10/1932 | Schurr | 51/26 |
| 2,942,389 | 6/1960 | Praeg et al. | 51/287 |

FOREIGN PATENT DOCUMENTS

| | | | |
|---|---|---|---|
| 326083 | 12/1917 | Fed. Rep. of Germany | 51/26 |
| 1161465 | 1/1964 | Fed. Rep. of Germany | 51/287 |
| 15947 | 12/1941 | United Kingdom | 51/287 |
| 801289 | 9/1958 | United Kingdom | 409/37 |
| 648352 | 2/1979 | U.S.S.R. | 409/49 |
| 778964 | 11/1980 | U.S.S.R. | 409/37 |

*Primary Examiner*—Robert P. Olszewski
*Attorney, Agent, or Firm*—Flynn, Thiel, Boutell & Tanis

[57] ABSTRACT

For the precision working of particularly hardened bevel gears, a method and an apparatus are disclosed in which the workpiece is moved during rolling contact with a bevel-gear-shaped tool having abrasive flanks. Workpiece and tool rotates in meshing relation with their axis spaced and crossed and each connected with a guide gear which also meshing engage and roll with one another. Both the workpiece-tool pair and also the guide-gear pair run each with backlash, however, on opposite flanks, so that the entire combination runs without backlash.

7 Claims, 3 Drawing Sheets

APPARATUS FOR THE PRECISION WORKING OF THE TOOTH SYSTEM OF BEVEL GEARS

This is a division, of application Ser. No. 832,100 filed Feb. 21, 1986, now U.S. Pat. No. 4,694,617.

CROSS REFERENCE TO RELATED APPLICATIONS

This application discloses subject matter that is related to subject matter disclosed in the following matters.

1. Ser. No. 816,946, filed on Jan. 6, 1986, which is a continuation of Application Ser. No. 576,672, filed on Feb. 3, 1984, now abandoned;
2. Ser. No. 664,812 filed Oct. 25, 1984;
3. Ser. No. 673,802 filed Nov. 21, 1984
4. Ser. No. 684,535 filed Dec. 21, 1984
5. Ser. No. 692,437 filed Jan. 17, 1985
6. Ser. No. 754,791 filed July 12, 1985
7. Ser. No. 732,198 filed May 8, 1985
8. Ser. No. 810,447 filed Dec. 17, 1985

FIELD OF THE INVENTION

The invention relates to a method for the precision working of the tooth system of bevel gears and an apparatus which is suited for carrying out the method.

BACKGROUND OF THE INVENTION

The invention thus starts out from a state of the art, as it is known from U.S. Pat. No. 2,942,389. In this method and apparatus, a bevel gear workpiece which is to be worked meshes rotatingly with a bevel-gear-shaped tool having an abrasive surface thereon. The workpiece is thereby retarded, which allows the teeth of the tool to be guided so to speak, namely onto the workpiece tooth system. Understandably, this method does not lead to the desired success, because the workpiece tooth system is not without error. Thus, the tool tooth system follows so to speak the workpiece tooth system resulting in only a partial improvement and without completely overcoming the inexactnesses in the formed teeth.

Therefore, the basic purpose of the invention is to further develop the above-described method so that the work machining result is improved and the mentioned deficiencies are avoided. Furthermore, a suitable apparatus for carrying out the method is provided.

The aforementioned purpose is inventively attained by a method wherein backlash is provided in two places on two sets of gear pairs, namely (1) between the successively engaging teeth on the workpiece and the tool and on one circumferentially facing side thereof remote from a first contact point and (2) between the successively engaging teeth on a pair of guide gears and on a side remote from a second contact point, which side faces in an opposite direction from the aforementioned one circumferentially facing side so that each set of gear pairs, namely, workpiece/tool and the two guide gears each have backlash but the four gears in combination are backlash free. The arrangement of guide gears on a workpiece spindle and on a tool spindle is actually known from German OS No. 33 04 980 (corresponding to U.S. Application Ser. No. 816,946, filed on Jan. 6, 1986, which is a continuation of Ser. No. 576 672, filed on Feb. 3, 1984, now abandoned), where a method and an apparatus for the precision working of spur and helical gears is described. The use of guide gears in the precision working of bevel gears is, however, by all means not obvious, since the geometry of the bevel gears is a different one than the one of spur gears. This also requires in different arrangements for the guide gears.

According to the inventive method, the tooth flanks of both straight and spirally toothed (or helically toothed) bevel gears can be precision worked. The preferred, however, not exclusive use lies in the working of hardened bevel gears, which heretofore could only be done using the slightly inexact lapping method or expensive precision grinding method.

BRIEF DESCRIPTION OF THE DRAWINGS

The invention will be described hereinbelow with reference to three exemplary embodiments, which are illustrated in FIGS. 1 to 6.

DETAILED DESCRIPTION

Figure 1:
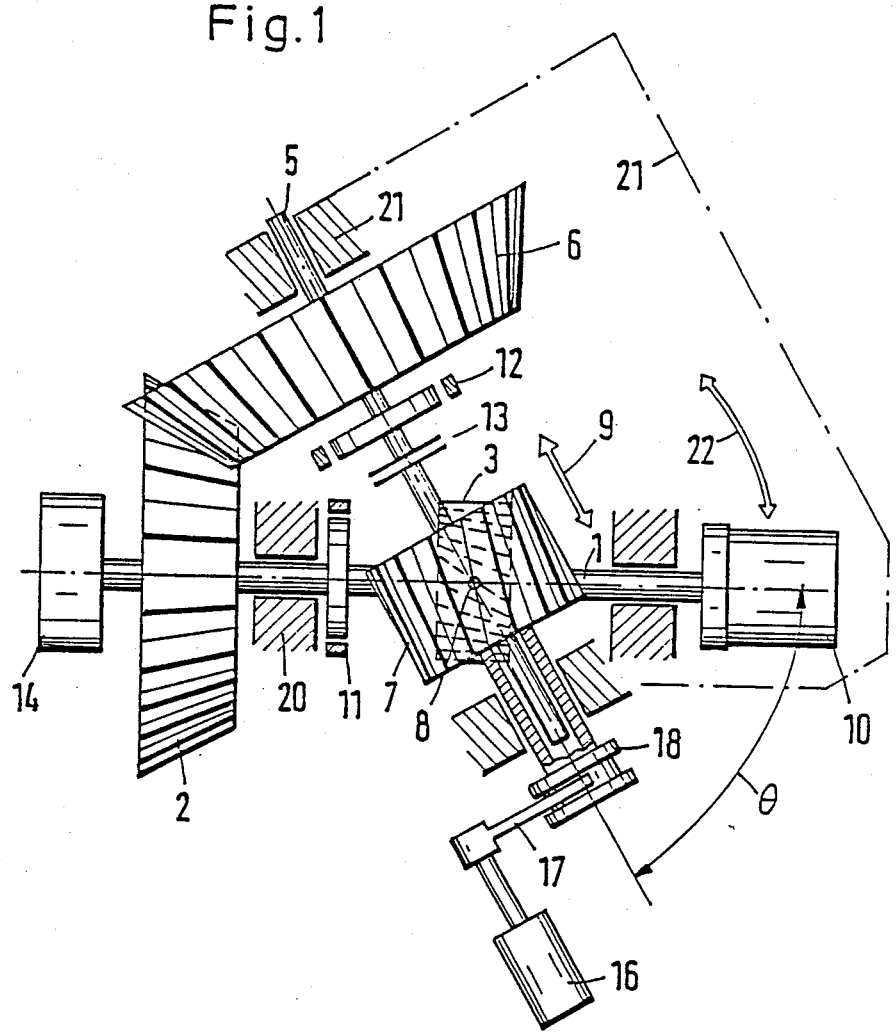
FIG. 1 schematically illustrates a top view of a first exemplary embodiment of the inventive apparatus.

A bevel gear 2 (workpiece) which is to be worked and a guide gear 3 are oriented side-by-side and coaxially (FIG. 1) on a workpiece spindle 1. The spindle 1 is rotatably supported in a frame 20 of a machine tool, which frame is not illustrated in detail. Both the workpiece 2 and guide gear 3 are secured with conventional devices so as to be axially and rotatably fixed to, however, exchangably mounted on the workpiece spindle 1. A toothed tool 6 in the form of a bevel gear and a guide gear 7 are mounted on a tool spindle 5. The tool 6 is also axially and rotatably fixed to, however, exchangably mounted on the spindle 5. The guide gear 7, however, is only rotatably fixed to the spindle 5. It can slide longitudinally of the spindle 5 and is exchangably mounted on the tool spindle 5. The spindle 5 is rotatably supported in a carriage 21 on the machine tool, which carriage 21 is not illustrated in detail. The tool has an abrasive work surface, thus tooth flanks, and mates with the tooth system of the workpiece 2. The guide gear 7 is, like the guide gear 3, a spur gear or a helical gear. Both guide gears mate with one another. The axes of the tool spindle 1 and of the workpiece spindle 5 are spaced from one another and are crossed. The socalled crossed-axes point 8 (common normal), that is the point of the smallest center distance, lies within the guide-gear pairings 3,7. To change the crossed-axes angle $\theta$, the carriage 21 is supported for pivotal movement about the crossed-axes point 8 (in direction of the arrow 22) and can be secured in numerous different positions. The devices for this are known in machine-tool apparatus.

The apparatus works so to speak according to the socalled plunge method, that is the tooth flanks of the workpiece tooth system are worked, for example ground, without any longitudinal or axial movement of the tool relative to the workpiece. It is therefore necessary that the rolling member (a rolling circle extended in the axial direction) of the tool joins closely the rolling member of the workpiece. Furthermore the entire workpiece tooth width must be covered by the tool tooth system. Both demands can be realized relatively easily, when the tool 6 and the workpiece 2 cooperate with one another in a manner like a hypoid gear.

The tooth system of the guide-gear pairing can actually - as illustrated - correspond with the one of a normal and known gear with crossed axes. It is advantageous and helpful to the work quality of the apparatus, when they, corresponding with the position of the crossed-axes point, are formed hyperboloidally or similarly. To drive the apparatus, a motor 10 and a brake 11 are provided on the workpiece spindle 1. The tool spindle 5 is equipped with a brake 12 and a separating coupling or clutch 13. With these devices, which can also be arranged at other points or can be supplemented with a flywheel mass 14 and/or a further motor on the tool spindle 5, the workpiece 2 can be worked under a single-flank contact by the tool 6.

Figure 2:
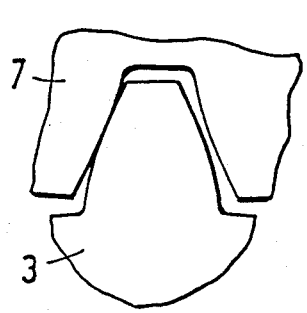
FIG. 2 illustrates in an enlarged scale a section of the tooth system of the guide gears.
Figure 3:
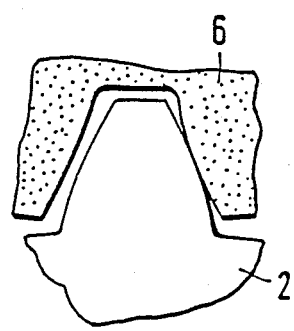
FIG. 3 illustrates also in an enlarged scale a section of the tooth system of the workpiece and tool.

FIG. 2 illustrates a tooth gap of the guide gear in an enlarged scale, into which is received a tooth of the guide gear 3. The tooth flanks contact on the left, while backlash exists on the right side. FIG. 3 illustrates also in an enlarged scale a tooth gap of the tool 6 and a tooth of the workpiece 2. The tooth flanks contact here on the right side, while backlash exists on the left. Thus, in the illustrated example, the right tooth flank of the workpiece is worked, while the left flank guides and supports the coaxial guide gear 3. For working of the other workpiece tooth flank, the relative position within the two gear pairings is changed, thus the flanks rest then on one another on the right side in FIG. 2 and on the left side in FIG. 3. To change the driving and thus also the driven tooth flanks, the direction of rotation of the motor 10 is changed and the separting coupling 13 is first opened and—after the flank change occurred— closed again. The brakes 11, 12 can thereby be used supportingly.

FIG. 1 illustrates yet another possibility of the flank change. The guide gear 7 is, as has already been mentioned, supported for longitudinal movement on the tool spindle 5. To manage the longitudinal movement in the direction illustrated by the arrow 9, a motor 16 is provided which engages by means of a selector fork 17 the shoulder 18 of the guide gear 7. When the motor is switched on, then the guide gear 7 is moved on the tool spindle 5, which is thereby advantageously interrupted with the separating coupling 13 and is held by the brake 12. Due to the tooth angle, the longitudinal movement 9 results in a relative rotation of the guide gears 3, 7 and thus of the workpiece 2 relative to the tool 6.

Figure 4:
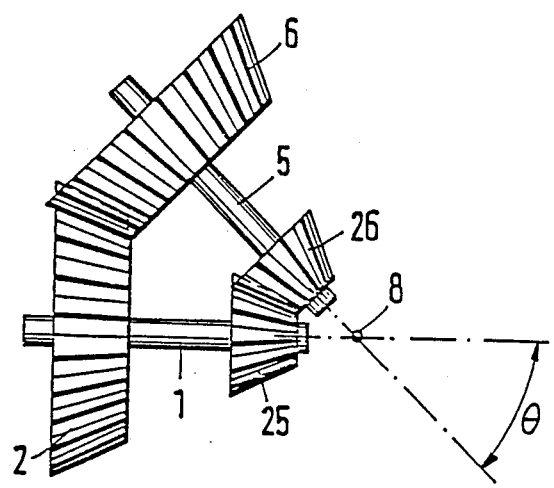
FIG. 4 illustrates a front view of a second exemplary embodiment of the inventive apparatus.
Figure 5:
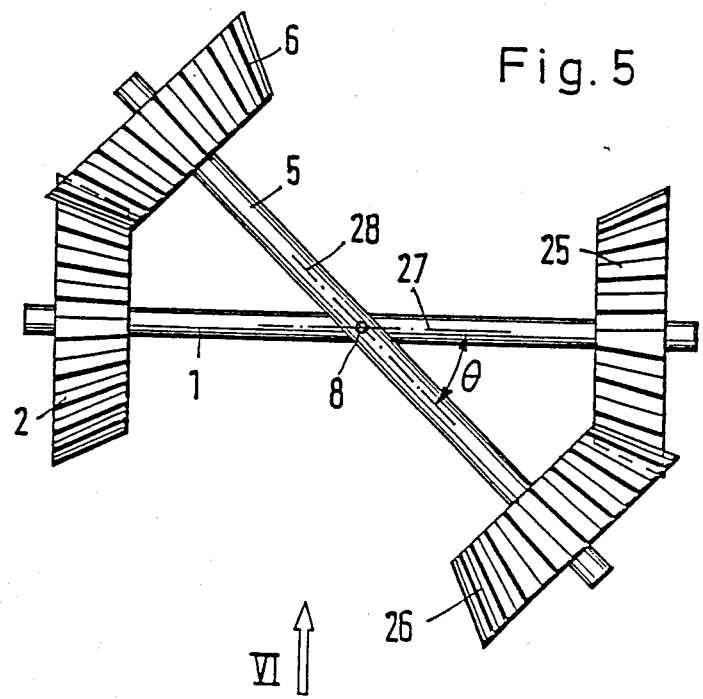
FIG. 5 illustrates a modification of FIG. 4.

In the exemplary embodiments according to FIGS. 4 and 5, the guide gears are constructed, like the workpiece 2 and the tool 6, as bevel gears 25, 26. The guide gears 25, 26 can be arranged between the workpiece-tool pair 2, 6 and the crossed-axes point 8 (FIG. 4) or—viewed from the workpiece-tool pair 2, 6—on the other side of the crossed-axes point (FIG. 5). It must be noted, that in both cases both the workpiece-tool pair 2, 6 and also the guide-gear pair 25, 26 are designed as hypoid gears. The axis 27 of the workpiece spindle and the axis 28 of the tool spindle are spaced from one another at a distance 29 (FIG. 6) and intersect in the crossed-axes point 8.

Figure 6:
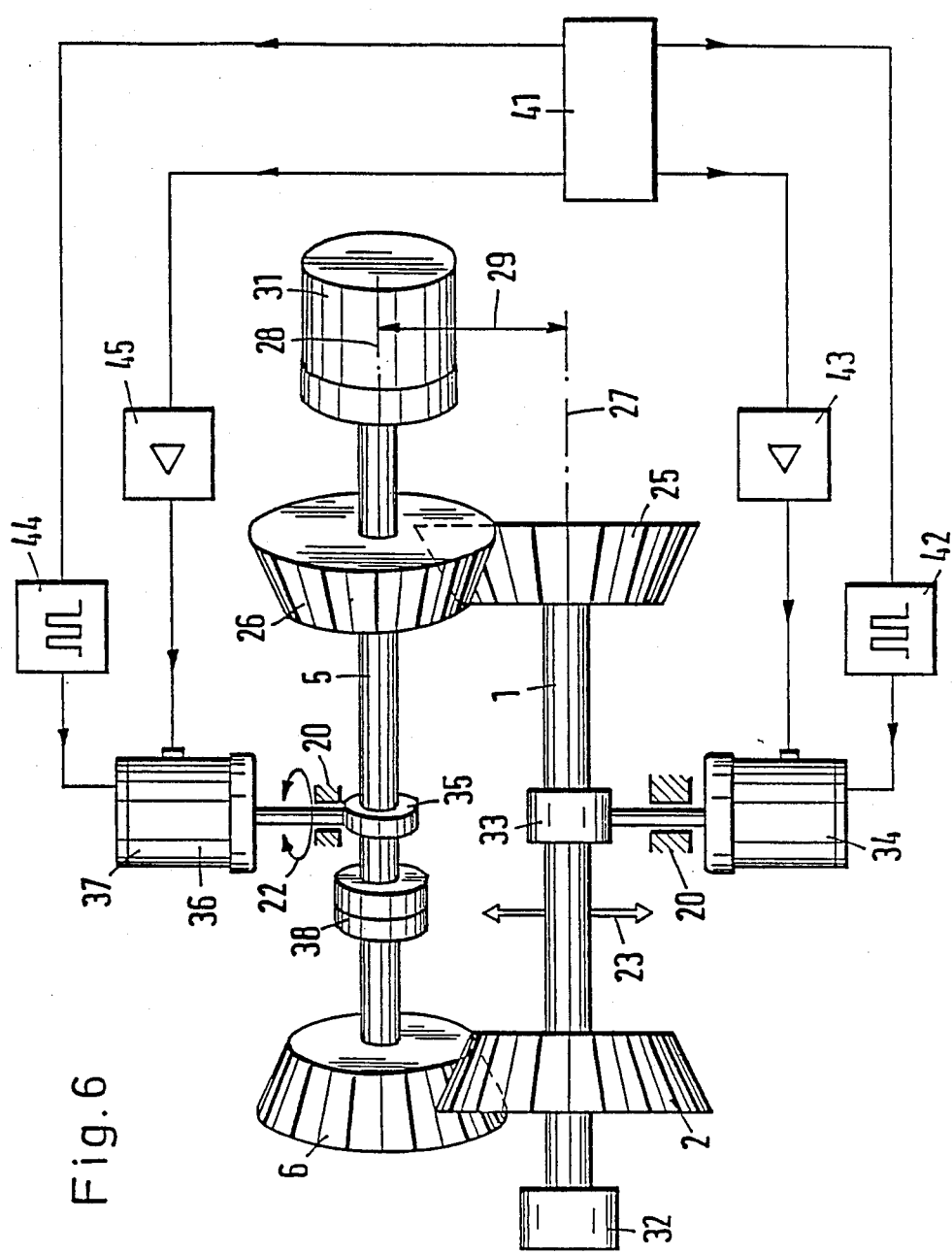
FIG. 6 is a front view of the apparatus of Figure 5 viewed in direction of the arrow VI in FIG. 5.

FIGS. 4 and 5 illustrate for clarity purposes only the two spindles 1 and 5 with the workpiece 2, the tool 6 and the guide-gear pair 25, 26. FIG. 6 illustrates the apparatus according to FIG. 5 in a second view corresponding with the direction of the arrow VI (FIG. 6, however, is also valid in a sense for the apparatus according to FIG. 4) and the important remaining devices of the apparatus are thereby also illustrated.

The tool spindle 5 can be driven by a motor 31 for effecting a rotational movement (rolling motion between tool and workpiece). The tooth system of the tool 6 drives the workpiece 2. The workpiece spindle 1 is supported on a workpiece carrier 33, which can be driven by means of devices which are known in the machine tool construction (and are not herein illustrated) by a feed motor 34 oriented at a right angle to the spindles 1, 5 to cause a movement of the spindle 1 toward and away from the spindle 5 (down-feed arrow 23). Also other suitable feeding means can be provided. The usual and known machine parts like guideways, bearings and the like were also left out in the illustration of FIG. 6.

The tool spindle 5 is supported on a tool carrier 35. The tool carrier 35 is pivotally supported, namely, about an axis 36 in the machine frame 20, which axis is directed at a right angle with respect to the spindles 1, 5. The pivoting movement 22 is created by a servomotor 37.

A guide gear 25 is arranged on the workpiece spindle 1 and the guide gear 26 on the tool spindle 5. Both mate, have the same speed ratio as the workpiece-tool pair 2, 6 and are adjusted to the position of the crossed-axes point 8 (common normal). The connection between the tool spindle 5 and the tool 6 can be interrupted by means of a shiftable coupling 38. A brake 32 or a driven plate engages the workpiece spindle 1. The two gear pairs work with backlash. That is, during working only one side of the teeth contact one another. The backlashes are, however, adjusted to one another such that both gear pairs run together without backlash. That is, if, for example, the right flank contacts in one gear, then the left flank contacts in the other gear on the same spindle. For changing the working tooth flanks, the shifting coupling 38 is briefly opened and the direction of rotation of the motor 31 is changed or a not illustrated turning gear is shifted. The brake 32 or the driven plate takes then care of the contacting of the desired tooth flanks.

The down-feed of the workpiece carrier 33 is controlled by a CNC-control 41, which for this purpose is connected through an incrementor 42 and an amplifier 43 to the servo-feed motor 34. The CNC-control 41 controls at the same time the adjustment of the crossed-axes angle $\theta$. For this purpose, the servomotor 36 is connected to the CNC-control 41 through an incrementor 44 and an amplifier 45. Down-feed and adjusting of the crossed-axes angle $\theta$ occur in response to one another, that is, the CNC-control 41 controls the motors 34, 37 such that an angle adjustment at a very specific value corresponds to a specific length unit in the down-feed path. Instead of the CNC-control 41, it is also possible to use a NC-control or another corresponding control, for example a link motion or another type of mechanical, electrical, hydraulic or pneumatic means.

If the center distance 29 is changed by feeding or retracting the workpiece carrier 33, then it is assured by the aforementioned control means that the workpiece 2 and the tool 6 on the one hand, and the two guide gears 3, 7 on the other hand, approach one another or are removed from one another always radially. Without these control means, the approaching and removing movements would only occur in direction of the down-feed 23 and would lead to improper meshes and thus to incorrect machining results.

The embodiments of the invention in which an exclusive property or privilege is claimed are defined as follows:

1. An apparatus for the precision working of the tooth system of a bevel gear workpiece by moving during rolling contact with a bevel-gear-shaped tool with axes which are spaced and crossed at a defined location, said tool having abrasive flank surfaces free of any uniformly directed cutting edges and a sufficient axial dimension so that engagement with said workpiece occurs from one axially facing side of said workpiece tooth system to the other, wherein said tool is supported by means of a tool spindle on a tool carrier and said workpiece is supported by means of a workpiece spindle on a workpiece carrier, and wherein drive means are provided for driving at least one of said spindles and brake means for braking the respective other spindle, wherein said tool for working said bevel-gear-shaped workpieces is bevel-gear-shaped, said tool and said workpiece meshingly engaging one another in a hypoid-like manner, first support means for supporting one of said spindles for movement at a right angle to its axis for facilitating an adjustment of a center distance between said two spindles and second support means for supporting one of said two spindles for pivotal movement about an axis which is oriented at a right angle to its axis to facilitate an adjusting of a crossed-axes angle formed between said two spindles, wherein the crossed axes of said workpiece and tool are oriented so that a common normal to the axes located at said defined location and extending in a direction parallel to the center distance adjustment is oriented externally of the confines of said workpiece and tool, and wherein said two spindles are connected to one another through a guide-gear pair having the same speed ratio as said workpiece-tool pair, and wherein a clutch means is provided on said spindle between at least one of said tool and the associated guide gear and between said workpiece and the associated guide gear.

2. An apparatus according to claim 1, wherein said guide gears are spur or helical gears, the common normal of which intersect the axes of workpiece (2) and tool (6) at least approximately at said defined location whereat exists the point of the smallest distance therebetween.

3. An apparatus according to claim 1, wherein said guide gears are a bevel-gear pair located between said workpiece-tool pair and said defined location whereat exists the point of the smallest distance between said workpiece axis and said tool axis.

4. An apparatus according to claim 1, wherein said guide gears are a bevel-gear pair located, relative to said workpiece-tool pair, on a side of said defined location remote from said workpiece-tool pair.

5. An apparatus according to claim 2, wherein at least one of said guide gears is axially movable relative to the other one with drive means being provided therefor.

6. An apparatus according to claim 3, wherein said first support means is connected to a control device, said control device being connected to said second support means so that said tool and said workpiece on the one hand, and said bevel guide gears on the other hand, approach one another always radially.

7. An apparatus according to claim 4, wherein said first support means is connected to a control device, said control device being connected to said second support means so that said tool and said workpiece on the one hand, and said bevel guide gears on the other hand, approach one another always radially.

* * * * *